(12) United States Patent  
Kato (10) Patent No.: US 6,601,470 B2  
(45) Date of Patent: Aug. 5, 2003

(54) CAM MECHANISM

(75) Inventor: Heizaburo Kato, Shizuoka (JP)

(73) Assignee: Sankyo Manufacturing Co., Tokyo (JP)

( * ) Notice: Subject to any disclaimer, the term of this patent is extended or adjusted under 35 U.S.C. 154(b) by 28 days.

(21) Appl. No.: 10/010,274

(22) Filed: Nov. 7, 2001

(65) Prior Publication Data

US 2002/0043126 A1 Apr. 18, 2002

(51) Int. Cl.[7] .......................... F16H 53/00; F16H 25/08
(52) U.S. Cl. .................... 74/567; 74/569; 74/813 R; 74/53; 74/84 R; 60/325; 483/44
(58) Field of Search ................ 74/567–569, 813 R, 74/53, 84 R; 60/325; 483/44

(56) References Cited

U.S. PATENT DOCUMENTS

| | | | | |
|---|---|---|---|---|
| 4,833,772 A | * | 5/1989 | Kobayashi et al. | 29/568 |
| 5,752,905 A | | 5/1998 | Yan et al. | |
| 5,806,367 A | * | 9/1998 | Kato | 74/84 R |
| 5,816,987 A | | 10/1998 | Yan et al. | |
| 5,943,860 A | * | 8/1999 | Kato | 60/325 |
| 5,943,915 A | * | 8/1999 | Kato | 74/490.09 |
| 6,186,014 B1 | | 2/2001 | Kato | |

FOREIGN PATENT DOCUMENTS

| | | | |
|---|---|---|---|
| JP | 5-305541 | 11/1993 | |
| JP | 8-226515 | * 9/1996 | 74/567 |
| JP | 8-309637 | 11/1996 | |
| JP | 10-138073 | 5/1998 | |
| JP | 10-141470 | 5/1998 | |
| JP | 11-188560 | 7/1999 | |
| JP | 2000-2311 | 1/2000 | |

* cited by examiner

*Primary Examiner*—Vinh T. Luong
(74) *Attorney, Agent, or Firm*—Harness, Dickey & Pierce P.L.C.

(57) ABSTRACT

A cam mechanism through which torque applied to an input shaft is converted into the bi-directional rotation and reciprocating axial movement of an output shaft. Two cam elements are utilized, one consisting of a roller gear cam attached to the input shaft, and the other of a recessed channel type cam formed on one side of the roller gear cam. Two power transfer mechanisms are also utilized, one consisting of a turret installed adjacently to the roller gear cam as means of imparting a rotational movement to the output shaft, and the other consisting of a reciprocating swing arm of which one end is driven by the channel type cam. The turret is connected to the output shaft through a sliding spline that allows the output shaft to move axially within the turret, by means of a movable connection with the reciprocating swing arm, while being rotationally driven by the splined connection. A slider part is adjacently installed to the output shaft in the same axial direction, and is used to connect the output shaft to the reciprocating swing arm through a moving joint provided between one end of the slider and output shaft, and a moving joint between the other end of the slider and the end of the reciprocating swing arm. The reciprocating swinging action of the swing arm end is thus converted into a reciprocating axial movement of the slider and output shaft. The use of a slider allows the range of swing of the swing arm to be adjusted by simply installing a slider of different dimensions.

4 Claims, 7 Drawing Sheets

CAM MECHANISM

BACKGROUND OF THE INVENTION

1. Field of the Invention

The invention relates to a cam mechanism through which rotating torque supplied to an input shaft is converted into a compound rotational and axial movement of an output shaft.

2. Description of the Related Art

Figure 10:
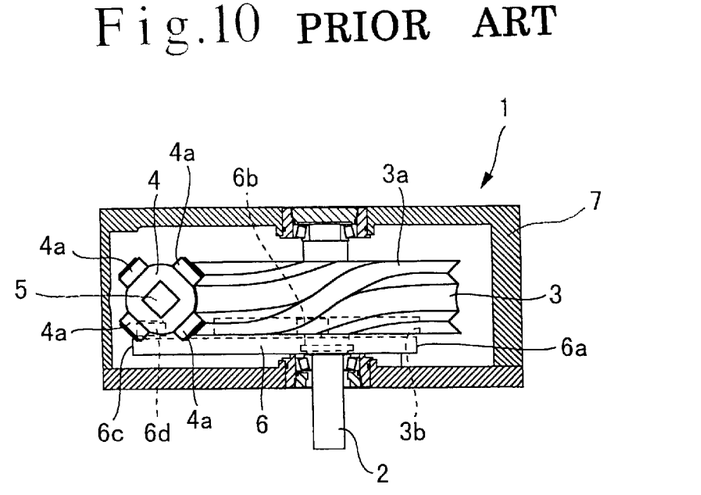
FIG. 10 is a plan cross section of a conventional cam mechanism as known in the art.
Figure 11:
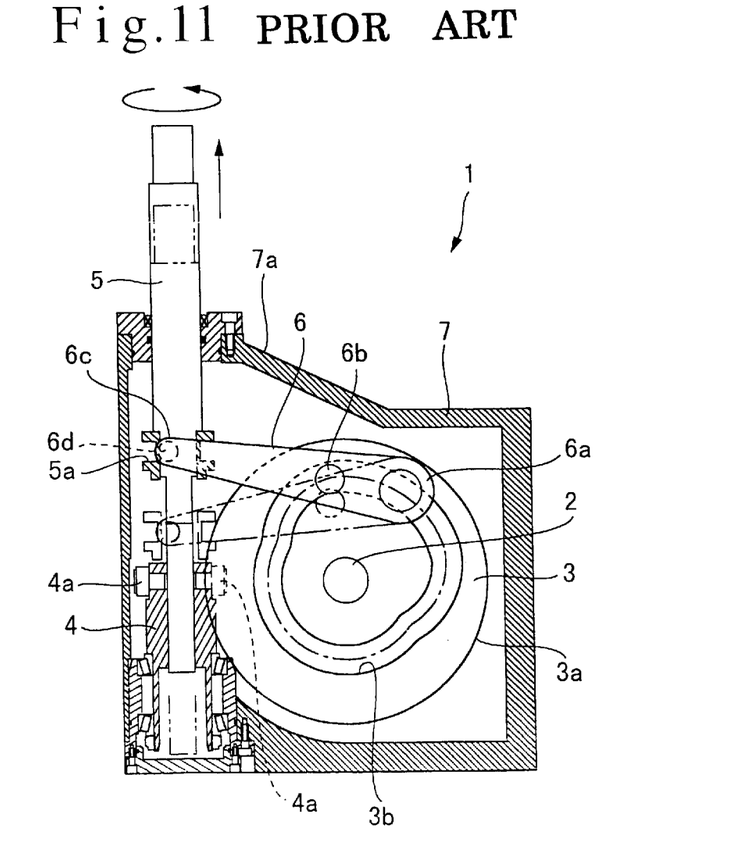
FIG. 11 is an elevation cross section of a conventional cam mechanism shown in FIG. 10.

The type of cam mechanism put forth by the invention is often referred to in the art as a "pick and press" mechanism or "automatic tool change unit." FIGS. 10 and 11 provide two views of this type of cam mechanism currently known in the art. Roller gear cam 3 is fixedly mounted to input shaft 2. Turret 4 incorporates cam followers 4a that ride between tapered ribs 3a of roller gear cam 3. Turret 4 is rotatably driven by the torque supplied by roller gear cam 3 to cam followers 4a. Output shaft 5 is attached to turret 4 by means of a sliding splined joint that allows the output shaft to be rotatably driven by the turret while axially sliding within the turret.

Moreover, endless channel cam 3b is provided on one face of roller gear cam 3. This structure provides a mechanism by which input shaft 2 is able to impart a reciprocating movement to swing arm 6 by locating one end of the swing arm within the rotating channel cam, and pivotably attaching the other end of the swing arm to output shaft 5. A mechanism is thus created through which the rotating movement of the channel cam is converted to a compound rotating and reciprocating movement of the output shaft. In applications where this cam mechanism is used as part of a tool exchange unit, a tool exchange arm is attached to the end of output shaft 5. The compound action generated by the cam mechanism first rotates the support arm to a position in front of the tool magazine, raises the arm to grip a tool in the magazine, drops the arm to remove the tool, and then rotates the arm in the opposite direction to bring the tool to the exchange position at the lathe, milling machine, machining center, or other like machine. The cam mechanism then raises the arm again, and finally drops the arm to complete the tool change cycle. This cycle is repeated whenever a tool change operation is executed.

This structure, wherein cam followers 4 are located so as to follow the contours of tapered rib 3a, necessitates that the rotating axis of turret 4 be oriented horizontally at a right angle in relation to the vertically oriented rotating axis of roller gear cam 3. The rotating axes of input shaft 2 and output shaft 5 are also relatively disposed at the same right angle. Moreover, swing arm 6 must be located adjacent to roller gear cam 3. Swing arm 6 incorporates base part 6a that is rotatably supported by housing 7, and centrally positioned cam follower 6b that rides within channel cam 3b. This structure necessitates that cam follower 6d, located on end 6c of the swing arm, forms a direct movable connection with flange joint 5a on output shaft 5.

In other words, output shaft 5 must provide a part to which turret 4 can be installed as means of imparting a rotating movement to the output shaft from ribs 3a, and must also include flange joint 5a through which an axially reciprocating movement can be imparted to the output shaft from swing arm 6. In this structure, a substantial space must be provided along the output shaft between turret 4 and flange joint 5a as means of allowing the swing arm to operate in a region separate from the turret. As a result, housing 7 must be fabricated to necessarily large dimensions to provide space for the swing arm to operate at a distance from turret 4 that will not interfere with the operation of turret 4. As illustrated in FIG. 11, housing 7 must incorporate extension housing 7a as means of providing the aforesaid space for the axial movement of output shaft 5 and swing arm 6. Because of the need to incorporate extension chamber 7a into housing 7, the housing becomes relatively large, thus posing various design difficulties in regard to incorporating the cam mechanism into a compact automatic tool change system and/or metal working machine.

SUMMARY OF THE INVENTION

The cam mechanism structure proposed by the invention provides adequate space for the reciprocating operation of the swing arm while effectively eliminating restrictions on the placement of the turret part that imparts the rotational movement to the output shaft, thereby allowing the entire cam mechanism to be made to smaller external dimensions.

The cam mechanism invention is comprised of a rotatable roller gear cam fixedly attached to a rotatable input shaft, a turret part rotatably located adjacent to and rotatably driven by the roller gear cam, a cam part formed on one face of the roller gear cam, a reciprocating swing arm located adjacent to and movably joined to the cam part, an output shaft to which the turret part is connected by means of an axially sliding spline joint so as to allow the output shaft to be rotatably driven by the turret part while the output shaft axially sliding thereon, an output shaft joint part formed on the output shaft, a slide rail part located adjacent to the turret part and oriented in an axial direction in relation to the output shaft, and a slider part capable of transferring a reciprocating movement of the swing arm to the output shaft by means of a movable connection between the swing arm and one end of the slider part, and a movable connection between the output shaft joint part and the other end of the slider part.

The reciprocating swinging movement of the swing arm is converted to the axial movement of the output shaft by means of the slider part, the output shaft is thus driven by the slider in the same axial direction as the slider. The use of the slider to transfer and convert the reciprocating swinging movement of the swing arm to the axial movement of output shaft results in a structure that eliminates the previous design restriction of locating the output shaft joint so as to not interfere with the movement of the turret. The structure put forth by the invention allows the range of swing arm movement to be established with a greater degree of latitude. For example, the invention makes possible a larger swing arm stroke within a housing that is no bigger than that used for a conventional cam mechanism. Conversely, the invention makes possible a cam mechanism that can provide the same swing arm stroke as that of the conventional type, but with the cam mechanism encapsulated within a smaller, more compact housing.

Moreover, the cam mechanism invention is structured so as to include a housing that supports a rotating movement of the input shaft and a compound rotating and axial movement of the output shaft. The roller gear cam incorporates tapered ribs formed on its radial perimeter, and an endless cam channel (corresponding to the cam part) formed on one of its lateral radial surfaces. The turret part incorporates radially protruding cam followers that extend to and within a contoured groove delineated by the tapered ribs on the roller gear cam. The swing arm is rotatably supported by the housing and incorporates two cam followers, one cam follower movably connected to the endless cam channel and the other movably connected to the slider part. The output shaft joint part is a grooved ring-type joint comprised of two flanges radially extending from a circumference of the output shaft.

The swing arm is characterized by an enlarged center section in which a curved slot, formed to a width slightly larger than a diameter of the input shaft, is provided as means of preventing the swing arm from contacting the input shaft when the swing arm traverses through its range of movement.

The slider is comprised of a base part and top part. The base part incorporates an elongated rounded hole whose long axis runs in a direction 90 degrees relative to a slider's direction of movement, and is movably connected to the swing arm. The top part incorporates an attached cam follower that movably connects to the output shaft joint part.

A tool exchange arm is installed to the output shaft as means of intermittently connecting the cam mechanism to tools to be exchanged. An approximate center of the tool exchange arm connects to one end of the output shaft. Tool gripping clamps are provided at each end of the arm as means of gripping tools. The rotating movement of the output shaft revolves the tool exchange arm while the axial movement of the shaft imparts a simultaneous lifting and falling movement to the arm in the axial direction of the output shaft. The roller gear cam and channel cam are designed to provide a desired timing of these rotational and lifting-falling axial movements in a manner that best effects a tool change operation for a specific application.

DESCRIPTION OF PREFERRED EMBODIMENTS

The following discussion will provide a detailed explanation, with reference to the attached figures, of an embodiment of the invention. The figures illustrate the invention embodied as the type of cam mechanism used to execute an automatic tool exchange operation for an automatic lathe, machining center, or other like mechanism. The invention is basically comprised of the following components and structures. Turret 14 is adjacently disposed to and rotatably driven by roller gear cam 13 by means of cam followers 20 that extend radially from turret 14 into cam valleys 18. Swing arm 15 is displaced adjacently to roller gear cam face 13a into which endless channel cam 19 is formed, and operates with a reciprocating swinging movement imparted by cam follower 25 following the contours of channel cam 19. Output shaft 16 is axially connected to turret 14, and is movably connected to the end of swing arm 15 by means of flange joint 22 that consists of two radial flanges formed on output shaft 16 a distance away from cam followers 20. Output shaft 16 is thus able to move in an axial direction by means of the pivotal attachment to swing arm 15 while being rotationally driven by turret 14. The characterizing feature of this cam mechanism is the inclusion of slider 30, located adjacent to cam followers 20 and aligned with output shaft 16, which is able to move adjacently along the same axial plane as output shaft 16. Slider 30 includes base part 30a that is pivotably attached to the end of swing arm 15, and tip part 30b that is pivotably attached to flange joint 22 of output shaft 16.

Figure 1:
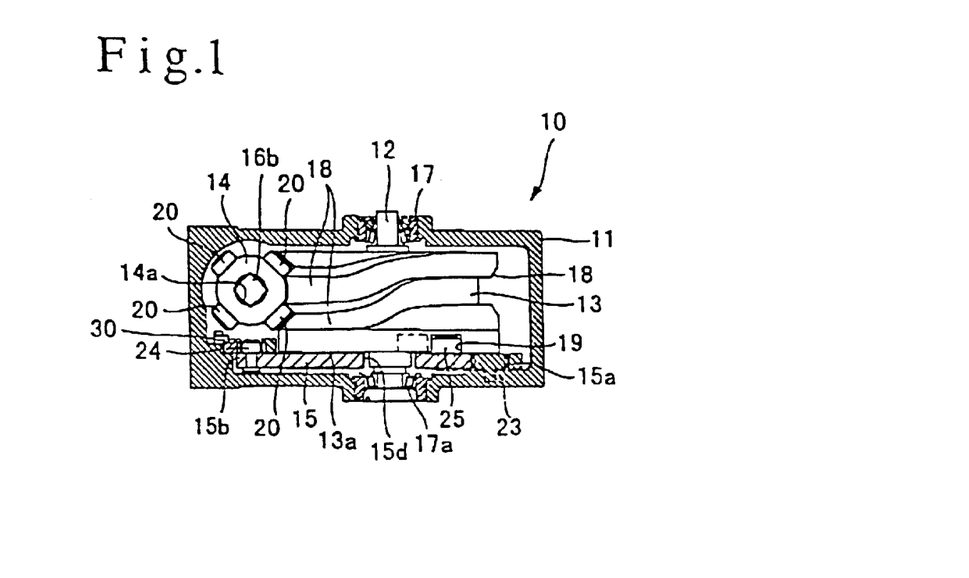
FIG. 1 is a plan view cross section of an embodiment of the invention.
Figure 2:
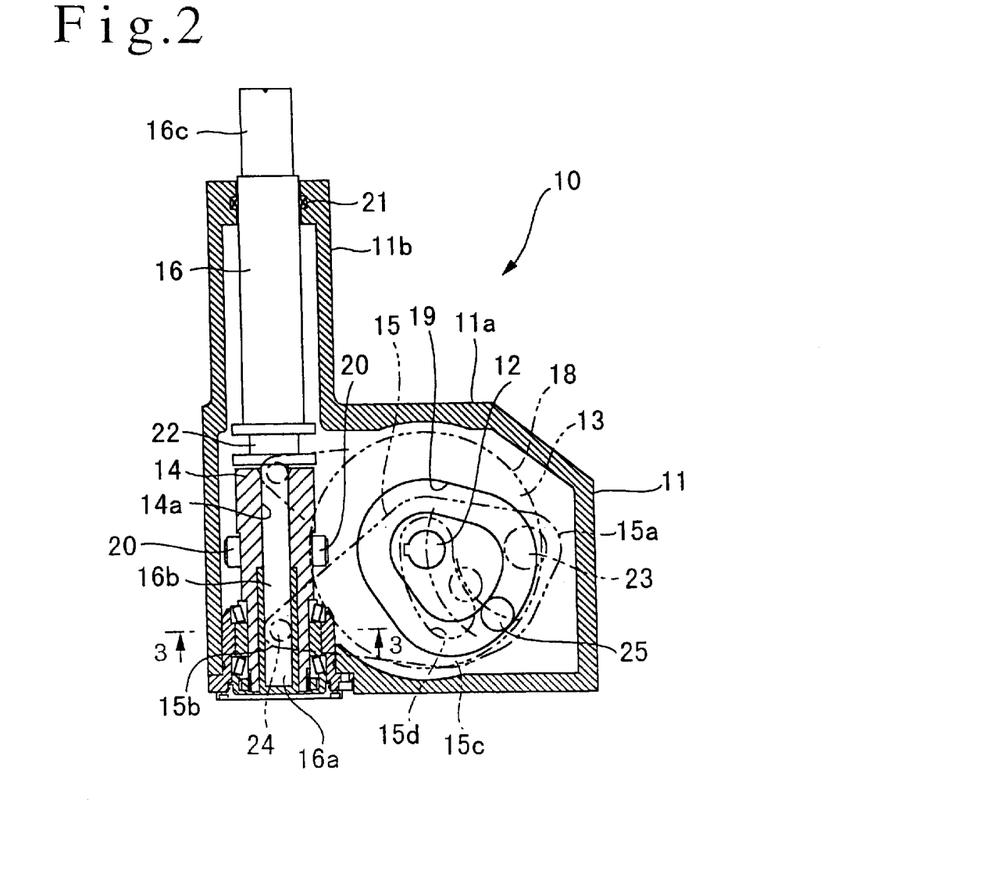
FIG. 2 is an elevation cross section of the invention shown in FIG. 1.

As illustrated in FIGS. 1 and 2, this embodiment of cam mechanism 10 provides a structure wherein input shaft 12, roller gear cam 13, turret 14, swing arm 15, output shaft 16, and their related parts and mechanisms are installed within housing 11. Input shaft 12 is structured as a fixed integral part of cylindrically shaped roller gear cam 13, and both ends in input shaft 12 are rotatably supported by bearings 17 and 17a in housing 11. The continuous rotation of roller gear cam 13 imparts a segmented rotational movement to turret 14 and a simultaneous vertical swinging movement to swing arm 15. Tapered ribs 18 are formed on the circumference of roller gear cam 13, and endless channel cam 19 is formed on one face 13a of the roller gear cam surrounding input shaft 12.

Turret 14 is structured as a cylindrical body of the approximate same length as the diameter of roller gear cam 13, and is oriented so as to be adjacently rotatable on an axis disposed 90-degrees from that of roller gear cam 13. Axial spline 14a is formed in the center of turret 14, and four cam followers 20, spaced at equal 90-degree angles so as to form a cross shaped structure when viewed from above, protrude outwardly from the perimeter of the turret. Cam followers 20 reside within the valley delineated by tapered ribs 18 formed on the perimeter of roller gear cam 13, thus forming a mechanism through which cam followers 20 impart a bi-directional revolving movement to turret 14, in specific arcs of rotation, by following the contours of the tapered ribs as roller gear cam 13 rotates.

Output shaft 16 includes slide shaft 16b located at the side of output shaft base part 16a. Slide shaft 16b is of the approximate same length as turret 14 and is movably installed within turret 14 by means of spline 14a. Spline 14a thus provides means by which output shaft 16 is able to be rotated by turret 14 while also sliding in an axial direction through the middle of turret 14. Output shaft end 16c protrudes from housing 11 as means of transferring the compound rotational and axial movements of the output shaft to an external mechanism. Seal 21 aids in the support of output shaft end 16c within housing 11. Flange joint 22, located between output shaft end 16c and slide shaft 16b, is formed as a fixed integral part output shaft 16 and provides means of transferring axial movement to the output shaft.

Swing arm 15, located adjacently to channel cam 19 formed into lateral face 13a of roller gear cam 13, incorporates swing arm base part 15a that pivots on housing 11 through stub shaft 23. Swing arm 15 also incorporates follower 24 attached to swing arm end 15b located on the turret side of swing arm 15. Swing arm 15 further incorporates expanded center section 15c located between the pivoting and swinging ends. Cam follower 25, fixedly installed to one side of center section 15c, protrudes into channel cam 19 as means of movably connecting swing arm 15 to roller gear cam 13. The aforesaid structure thus establishes a mechanism through which the rotating movement of roller gear cam 13 is converted into a reciprocating swinging movement of swing arm 15 pivoting on stub shaft 23. Curved slot 15d is opened across the widest part of swing arm 15 as means of providing space for swing arm 15 to swing over input shaft 12 without interference. Curved slot 15d is formed to a width greater than the diameter of input shaft 12 and a length sufficient to allow swing arm 15 to pivot through its required range of travel on stub shaft 23.

Figure 3:
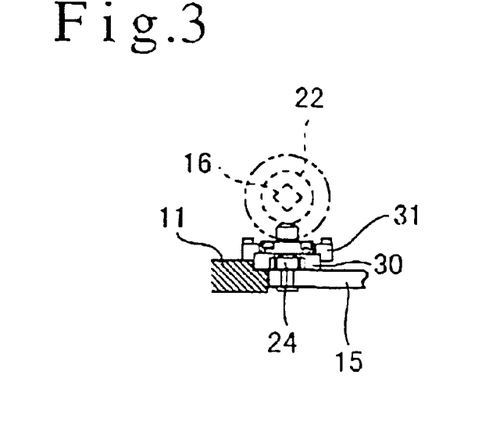
FIG. 3 is a detail cross section of line 3—3 of FIG. 2.

The embodiment provides for the installation of slider 30, a plate-like structure that faces turret 14 adjacent to swing arm end 15b, that is able to move in the same axial direction as output shaft 16. Clearance is provided between slider 30 and cam followers 20 as means of preventing interference between the two components. As shown in FIG. 3, slider 30 slides in the space provided between housing 11 and slide guide 31, slide guide 31 being fixedly installed to housing 11.

Figure 4:
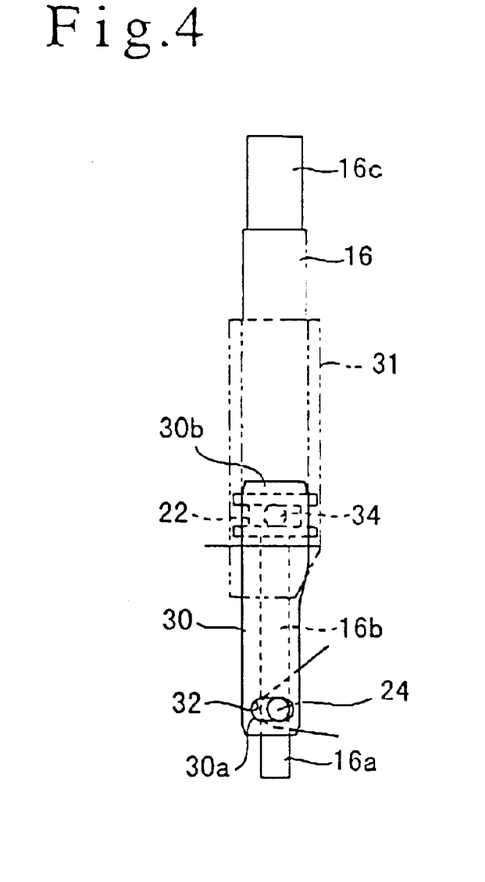
FIG. 4 is an elevation illustrating the relationship between the slider and output shaft of the cam mechanism invention shown in FIG. 1.
Figure 5:
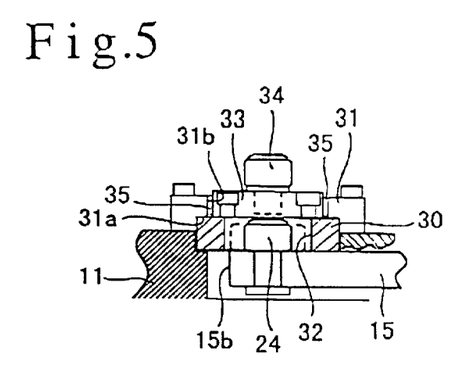
FIG. 5 is an enlarged cross section of the connecting part between the swing arm and slider of the cam mechanism invention shown in FIG. 1.

As illustrated in FIG. 4, slider bottom end 30a incorporates rounded slot 32 whose long dimension is disposed at a right angle in relation to the movement direction of slider 30. Swing arm cam follower 24, fixedly attached to swing arm 15, movably resides within rounded slot 32. As illustrated in FIG. 5, cam follower 34 is fixedly attached to slider upper end 30b through follower boss 33, and movably connects to flange joint 22 on output shaft 16.

Slider guide 31 incorporates cutout groove 31a that joins to and overlaps the longitudinal edge of slider 30 to a depth of approximately half the thickness of slider 30. Slot 31b is formed in the center of cutout groove 31a to a width slightly larger than that of follower boss 33 as means of allowing boss 33 to move within slot 31b without obstruction. Slot 31b incorporates a pair of slide rails 35, each slid rail being attached to an internally facing surface of slot 31b as means of propagating a smooth sliding movement of follower boss 33.

Figure 8:
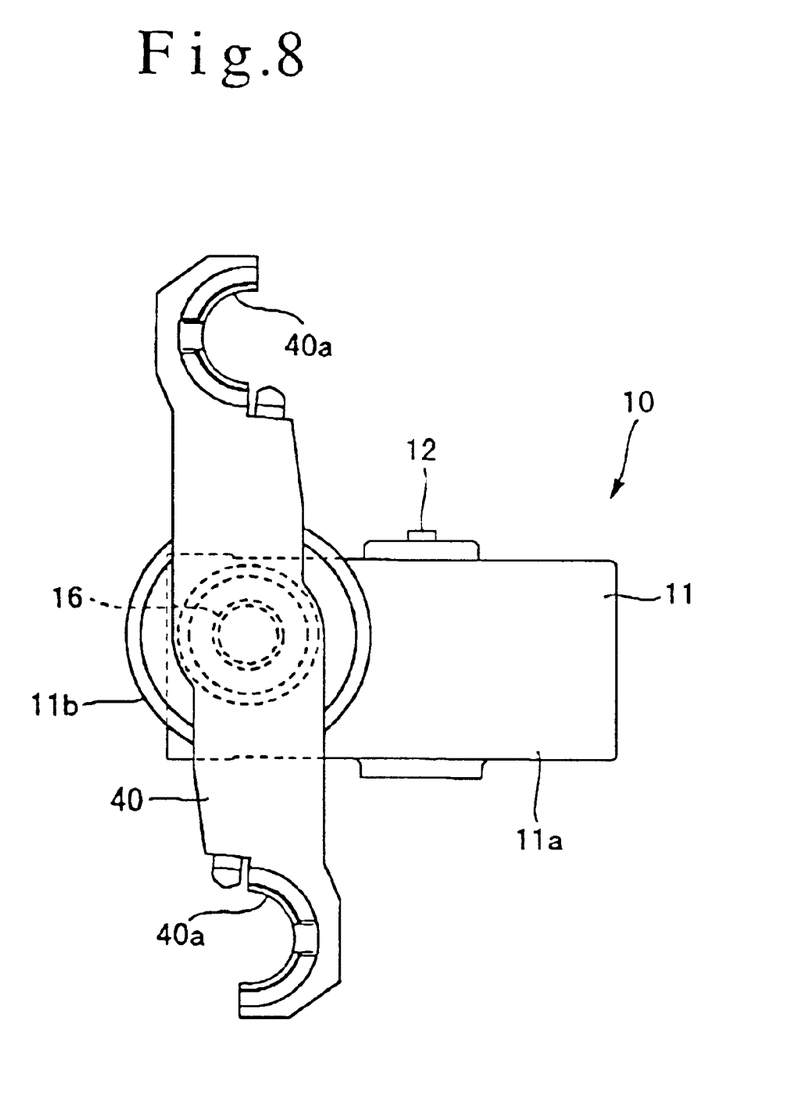
FIG. 8 is a plan view of a tooling exchange arm attached to the cam mechanism shown in FIG. 1.
Figure 9:
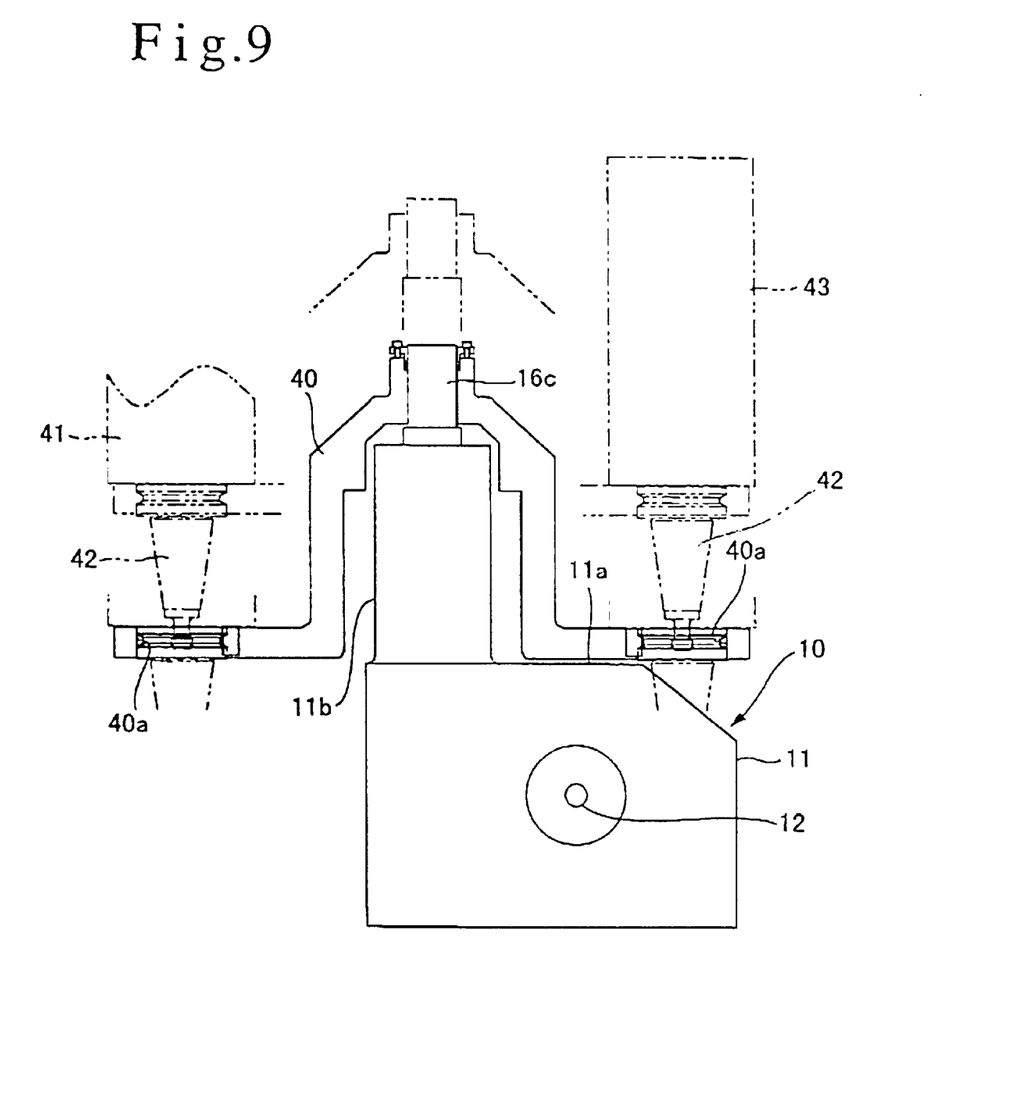
FIG. 9 is an elevation of a tooling exchange arm attached to the cam mechanism shown in FIG. 8.

As shown in FIGS. 8 and 9, tool exchange arm 40 is attached to the end of output shaft 16 with the purpose of applying the rotating and linear movements generated by the cam mechanism to the installation and removal of tool 42 to and from metal processing machine 41. Tool exchange arm 40 is fixedly connected to the end of output shaft 16 at the approximate center of the arm, and incorporates clamp part 40a at each end as means of grasping and releasing tool 42. One of the clamp parts is used to grasp and transfer a new tool from the tool magazine to the metal processing machine, while the other clamp part is used to return a previously used tool from the metal processing machine to the tool magazine. This operation is accomplished by the tool exchange arm rotating 180 degrees, moving upward in a linear direction to install a new tool in the metal processing machine while the previously used tool is simultaneously returned to the tool magazine. The tool exchange arm them lowers and rotates 90-degrees to complete one tool change cycle.

The cam mechanism described in the embodiment accomplishes the above operation through a mechanism wherein the rotation of input shaft 12 and attached roller gear cam 13 impart an arc of rotational to turret 14 resulting from cam followers 20 following the contours of tapered ribs 18. The partial rotation of tool exchange arm 40 is thus made possible by turret 14 rotationally driving output shaft 16 through their mutual splined connection. The degree of movement of tool exchange arm 40 is determined by the type of profile used for tapered ribs 18.

Figure 6A:
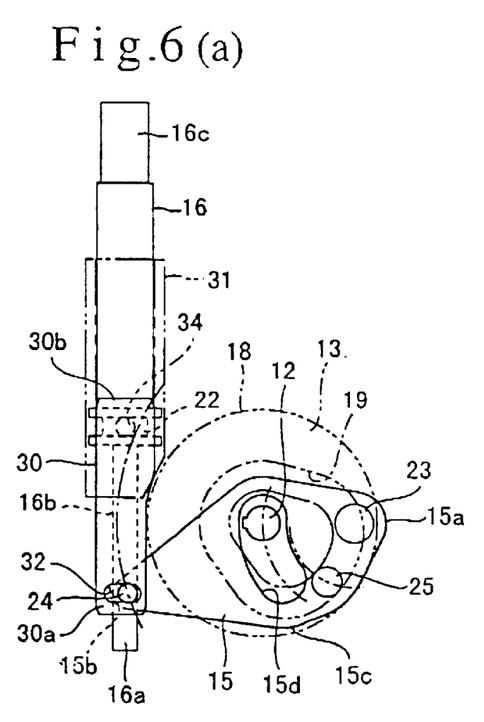
FIG. 6 illustrates the output shaft (of the cam mechanism shown in FIG. 1) positioned at its lowest point of axial traverse.
Figure 6B:
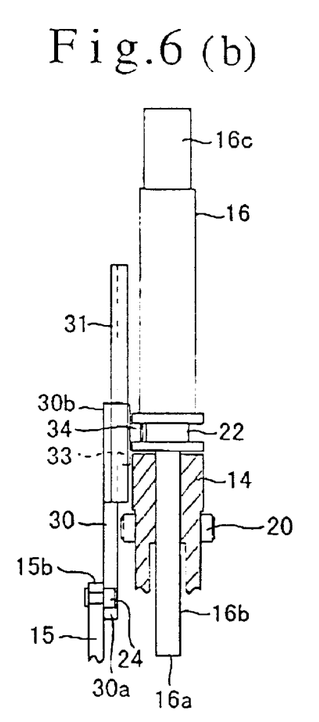
Figure 7A:
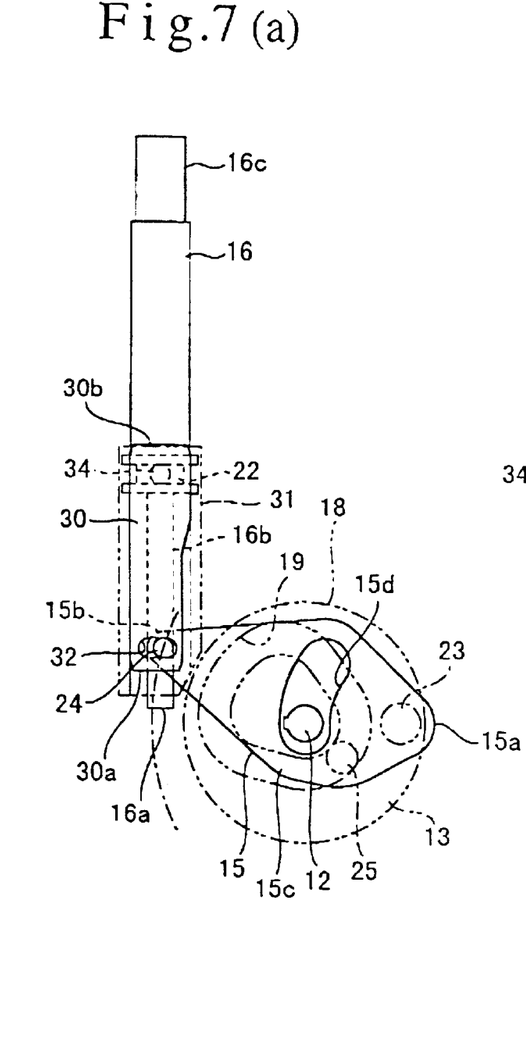
FIG. 7 illustrates the output shaft (of the cam mechanism shown in FIG. 1) positioned at its highest point of axial traverse.
Figure 7B:
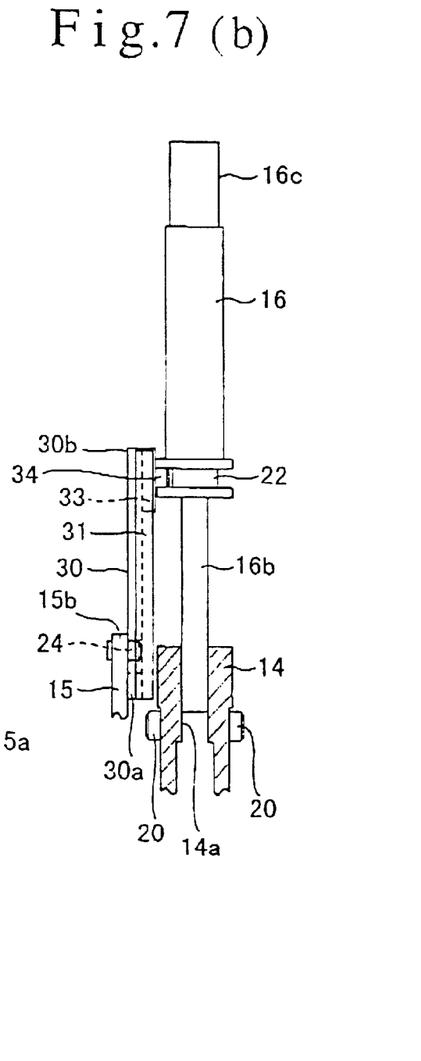

Moreover, the rotation of roller gear cam 13 also imparts a reciprocating pendulum type of movement to swing arm 15 through an action in which swing arm cam follower 25 adheres to the moving contours of channel cam 19. The pendulum movement of swing arm 15 is transferred to slider 30 through cam follower 24. FIG. 6 shows the position of slider 30 at the beginning of its stroke. The upward travel of swing arm end 15b, as shown in FIG. 7, imparts a like upward movement to slider 30, and because flange joint 22 is connected to slider cam follower 34, output shaft 16 travels upward together with slider 30 in a direction outward from housing 11. The continued rotation of roller gear cam 13 causes swing arm end 15b to lower, thus bringing slider 30 back to its lower position, a movement that pulls output shaft 16 inward toward the internal area of housing 11. The continuous rotation of roller gear cam 13 is thus able to impart a reciprocating axial movement to output shaft 16.

As a result of the aforesaid mechanism, the compound rotational and axial movements of output shaft 16 are transferred to identical rotational and axial movements of tool exchange arm 40. The extent and relative timing of the rotational and linear traversing movements of tool exchange arm 40, that is, the movements needed to accurately execute a tool exchange cycle, are determined by the physical profiles of tapered ribs 18 and channel cam 19.

In the embodiment of the cam mechanism put forth by the invention, the reciprocating swinging movement of swing arm 15 is imparted to output shaft 16 through slider 30 moving on the same axial plane as output shaft 16. In other words, slider 30 is newly provided as means of transferring the reciprocal swinging movement of swing arm 15 to output shaft 16. A conventionally known cam mechanism, of the type that relates closely to the invention, requires a structure in which the range of placement of the turret is restricted due to the direct connection utilized between the output shaft flange joint and swing arm end. The invention, however, proposes a cam mechanism structure that allows unrestricted placement of the turret, thus allowing a wider range of swing arm travel that results in a greater range of axial movement for the output shaft. There are numerous advantages to the structure proposed by the invention. For example, were the invention to be installed within a conventionally sized housing, the cam mechanism would offer a longer swing arm stroke than previously possible with the conventional mechanism. Furthermore, in cases where a swing arm stroke were required of the length provided by a conventional cam mechanism, the use of the invention would allow the cam mechanism housing to be made to significantly smaller external dimensions.

Housing 11 can be made to a more compact size because it need not be extended diagonally upward in the direction of output shaft 16. In other words, housing top part 11a can be lowered and made parallel with the bottom of the housing, and cylindrically shaped housing extension 11b, rising upward from top part 11a at a 90-degree angle, can be used to provide support for output shaft 16. This structure, as shown in FIG. 9, allows both ends of tool exchange arm 40 to be formed as "L" shapes that extend directly downward along housing extension 11b, thus allowing the cam mechanism to be placed closer to the attachment and removal locations at the machine spindle and tool magazine. The result is that the metal processing machine can be made to smaller external dimensions without any sacrifice in the performance of the automatic tool exchange system.

In the embodiment presented here, both sides of roller gear cam 13 are supported by the ends of input shaft 12 which in turn are rotatably supported by housing 11. Curved slot 15d is formed as an open void within swing arm 15 as means of preventing interference between the input shaft and swing arm. Another structure is possible in which the roller gear cam may be supported on one side only with swing arm 15 being located on the opposite non-supported side of the roller gear cam, thus making it unnecessary to provide curved slot 15d. While the embodiment presents a structure in which endless channel cam 19 is integrally formed within one lateral surface of roller gear cam 13, channel cam 19 may also be structured as a separate component attached to the roller gear cam. While the invention is here embodied as a cam mechanism utilized as part of an automatic tool exchange system for a lathe, machining center, milling machine, or other like mechanism, the invention may also be applied to any mechanism or mechanical device the calls for a compound rotational and axial movement of an output shaft powered by torque supplied to an input shaft. Moreover, the tapered ribs and channel cam may be structured as any type of cam configuration deemed appropriate for the application.

What is the claimed is:

1. A cam mechanism comprised of;
   a roller gear cam fixedly attached to a rotatable input shaft;
   a turret part located adjacent to and rotatably driven by said roller gear cam;
   a cam part formed on one face of said roller gear cam;
   a reciprocating swing arm located adjacent to and movably joined to said cam part;
   an output shaft to which said turret part is connected by means of an axially sliding spline joint, said output shaft being rotatably driven by said turret part;
   an output shaft joint part formed on said output shaft;
   a slider part having one end engaged with said swing arm and the other end engaged with said output shaft joint part, said slider part being capable of converting a swinging reciprocating movement of said swing arm to a reciprocating axial movement of said output shaft; and
   a housing enclosing said cam mechanism;
   wherein said input shaft is rotatably mounted within said housing;
   said output shaft is movably supported in radial and axial directions by said housing, said roller gear cam incorporates tapered ribs formed on its radial circumference, said turret part is rotatably supported by said housing and incorporates cam followers that movably connect to said tapered ribs;
   said cam part is structured as a recessed channel type cam;
   said reciprocating swing arm is pivotably supported by said housing and incorporates a pair of cam followers, one cam follower movably connected to said recessed channel cam, and the other cam follower movably connected to said slider part; and
   said output shaft joint part is structured as a flanged joint that radially extends from said output shaft.

2. A cam mechanism claimed in claim 1 wherein said reciprocating swing arm incorporates a widely expanded section into which a curved slot opening is provided as means of preventing interference between said input shaft and reciprocating swing arm throughout a complete range of a swing arm travel, said curved slot being formed to a width greater than a diameter of said input shaft.

3. A cam mechanism as comprised of:
   a roller gear cam fixedly attached to a rotatable input shaft;
   a turret part located adjacent to and rotatably driven by said roller gear cam;
   a cam part formed on one face of said roller gear cam;
   a reciprocating swing arm located adjacent to and movably joined to said cam part;
   an output shaft to which said turret part is connected by means of an axially sliding spline joint, said output shaft being rotatably driven by said turret part;
   an output shaft joint part formed on said output shaft; and
   a slider part having one end engaged with said swing arm and the other end engaged with said output shaft joint part, said slider part being capable of converting a swinging reciprocating movement of said swing arm to a reciprocating axial movement of said output shaft;
   said slider part incorporating a base part and a tip part, said base part incorporating an elongated hole whose long axis is oriented at a right angle, in relation to a direction of a slider part travel, as means of movably connecting to said swing arm, and said tip part being movably connected to said output shaft joint part through a cam follower part.

4. A cam mechanism comprised of:
   a roller gear cam fixedly attached to a rotatable input shaft,
   a turret part located adjacent to and rotatably driven by said roller gear cam,
   a cam part formed on one face of said roller gear cam,
   a reciprocating swing arm located adjacent to and movably joined to said cam part,
   an output shaft to which said turret part is connected by means of an axially sliding spline joint, said output shaft being rotatably driven by said turret part,
   an output shaft joint part formed on said output shaft, and
   a slider part having one end engaged with said swing arm and the other end engaged with said output shaft joint part, said slider cart being capable of converting a swinging reciprocating movement of said swing arm to a reciprocating axial movement of said output shaft;
   wherein a tool exchange arm is fixedly attached to said output shaft at a rotating center of said tool exchange arm, and each end of said tool exchange arm is equipped with a clamp part.

* * * * *